United States Patent [19]

Mitchell

[11] Patent Number: 5,219,176
[45] Date of Patent: Jun. 15, 1993

[54] ONE-PIECE STEERING KNUCKLE ASSEMBLY

[76] Inventor: James Mitchell, 2808 Range Line Cir., Mequon, Wis. 53092

[21] Appl. No.: 781,537

[22] Filed: Oct. 22, 1991

Related U.S. Application Data

[63] Continuation-in-part of Ser. No. 537,317, Jun. 12, 1990, abandoned, which is a continuation-in-part of Ser. No. 430,754, Nov. 2, 1989, abandoned.

[51] Int. Cl.[5] .............................................. B62D 7/18
[52] U.S. Cl. .................................... 280/96.1; 72/356
[58] Field of Search .......................... 280/96.1, 93; 29/DIG. 18, 557, 558; 72/356, 357

[56] References Cited

U.S. PATENT DOCUMENTS

| | | | |
|---|---|---|---|
| 1,755,627 | 4/1930 | Bijur . | |
| 2,556,767 | 6/1951 | McCann . | |
| 3,026,124 | 3/1962 | Eyb . | |
| 3,542,392 | 11/1970 | Cumming . | |
| 3,749,415 | 7/1973 | Sampatacos . | |
| 3,865,394 | 2/1975 | Epner et al. . | |
| 3,889,512 | 6/1975 | Delio | 72/356 |
| 3,908,480 | 9/1975 | Afanador et al. | 74/511 |
| 4,452,347 | 6/1984 | Dozier . | |
| 4,690,418 | 9/1987 | Smith . | |
| 4,693,487 | 9/1987 | Cooper | 280/96.1 |
| 4,736,964 | 4/1988 | Specktor . | |
| 4,761,019 | 8/1988 | Dubensky . | |
| 4,805,940 | 2/1989 | Ohno et al. . | |
| 4,967,584 | 11/1990 | Sato | 72/356 |

FOREIGN PATENT DOCUMENTS

| | | | |
|---|---|---|---|
| 60-138045 | 7/1985 | Japan | 280/96.1 |
| 60-138046 | 7/1985 | Japan | 280/96.1 |
| 60-138047 | 7/1985 | Japan | 280/96.1 |
| 60-138049 | 7/1985 | Japan | 280/96.1 |
| 75020 | 11/1913 | Switzerland | 280/96.1 |
| 713213 | 8/1954 | United Kingdom | 280/96.1 |

OTHER PUBLICATIONS

Forging Industry Handbook, edited by Jon E. Jensen, 1970 Edition first page of Chapter 2 and pp. 8-13 and 28-31, published by Forging Industry Association.

One page publication of The Vauxhall Motors, Ltd. showing a typical truck steering knuckle and brake assembly.

The Dana Corp., Spicer Axle Division one page publication showing the "On-highway EFA-18F3" I-beam assembly.

*Primary Examiner*—Karin L. Tyson
*Attorney, Agent, or Firm*—Quarles & Brady

[57] ABSTRACT

A one-piece steering knuckle assembly for heavy commercial vehicles such as trucks has a flanged body wherein the tie rod arm and in some instances the steering arm extend from the flanged body in a one-piece manner. The flanged body is constructed and arranged to receive a brake assembly thereon and the wheel spindle extends from the flanged body also in a unitary manner. In a preferred manner, the steering or the tie rod arms are forged to the flanged body through enlarged bosses which provide for connection to an axle by a king pin.

7 Claims, 3 Drawing Sheets

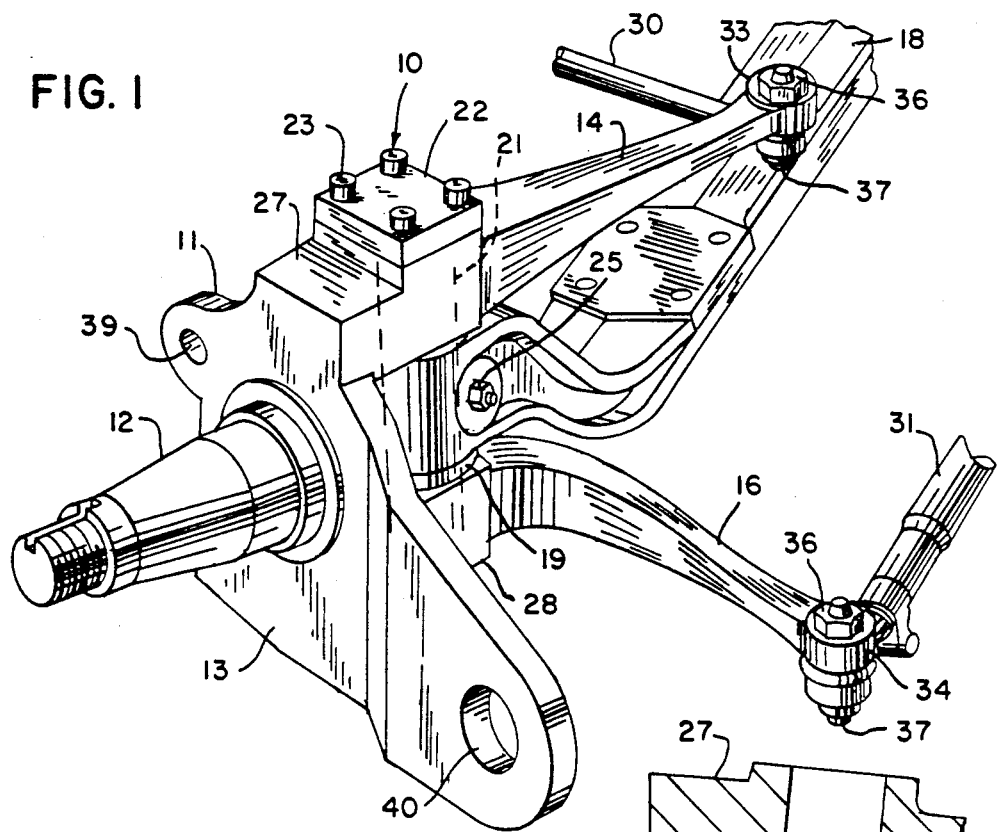
FIG. 1
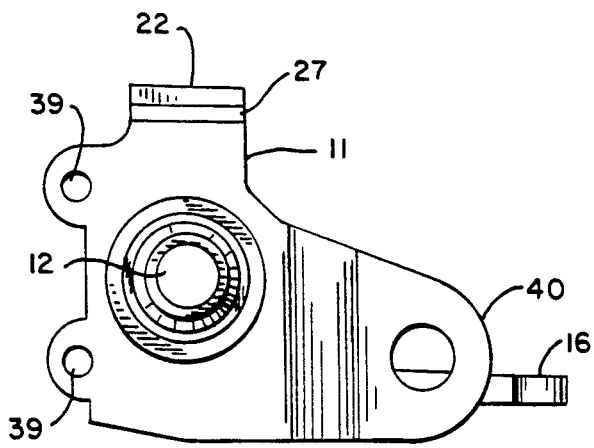
FIG. 2
FIG. 3

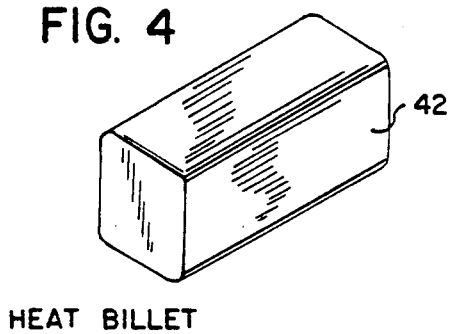
FIG. 4 HEAT BILLET
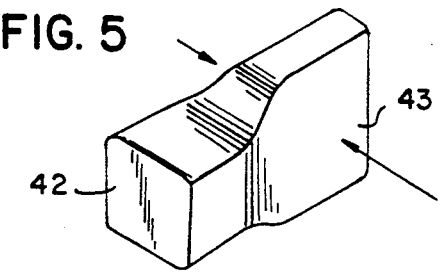
FIG. 5 FORGING ROLL
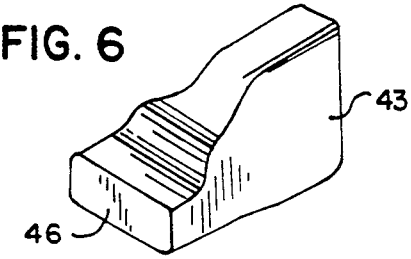
FIG. 6 TAIL END & PREFORM
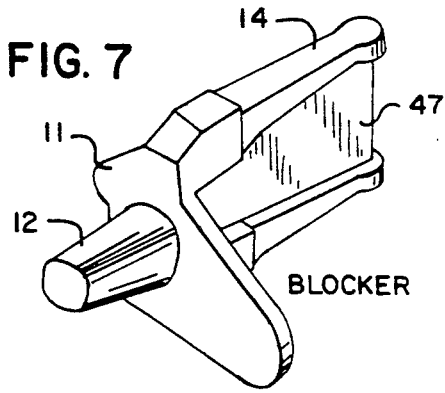
FIG. 7 BLOCKER
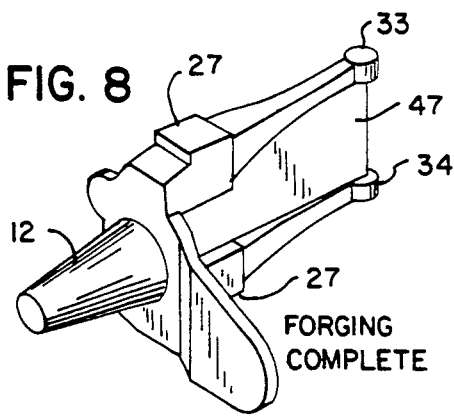
FIG. 8 FORGING COMPLETE
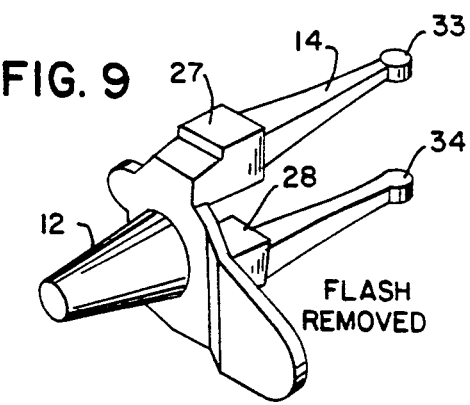
FIG. 9 FLASH REMOVED
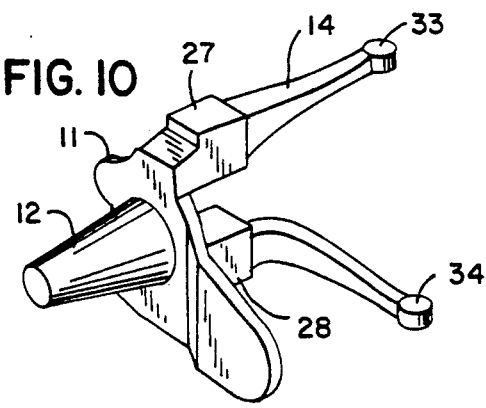
FIG. 10 DIE FORM TIE ROD END
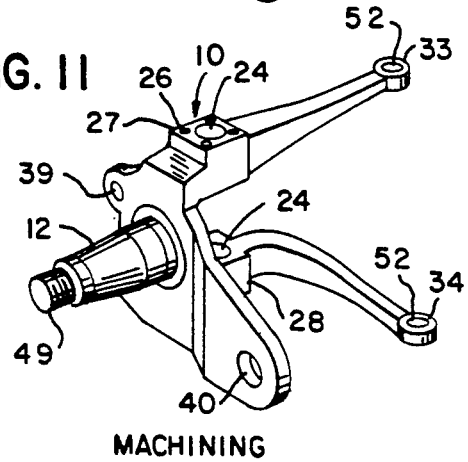
FIG. 11 MACHINING

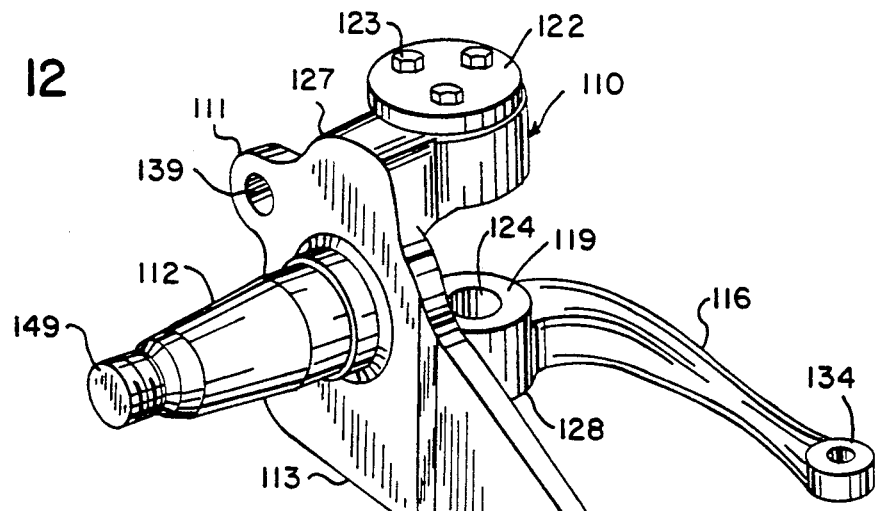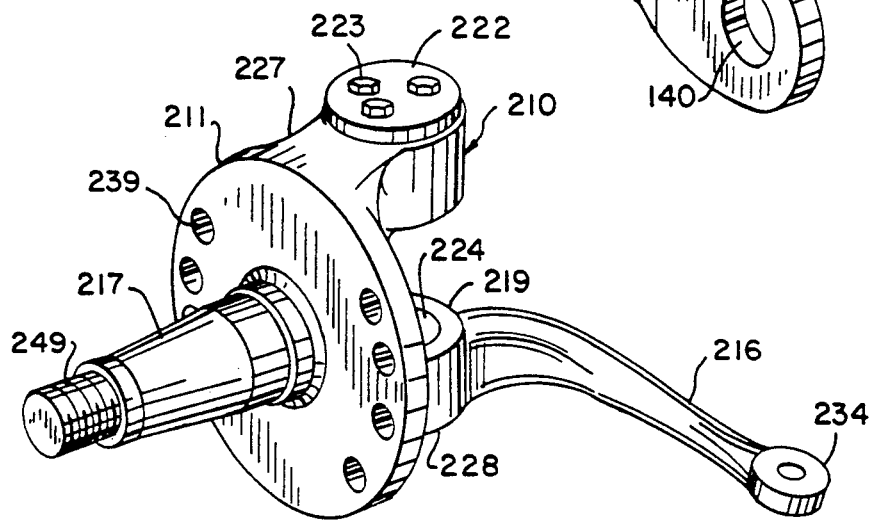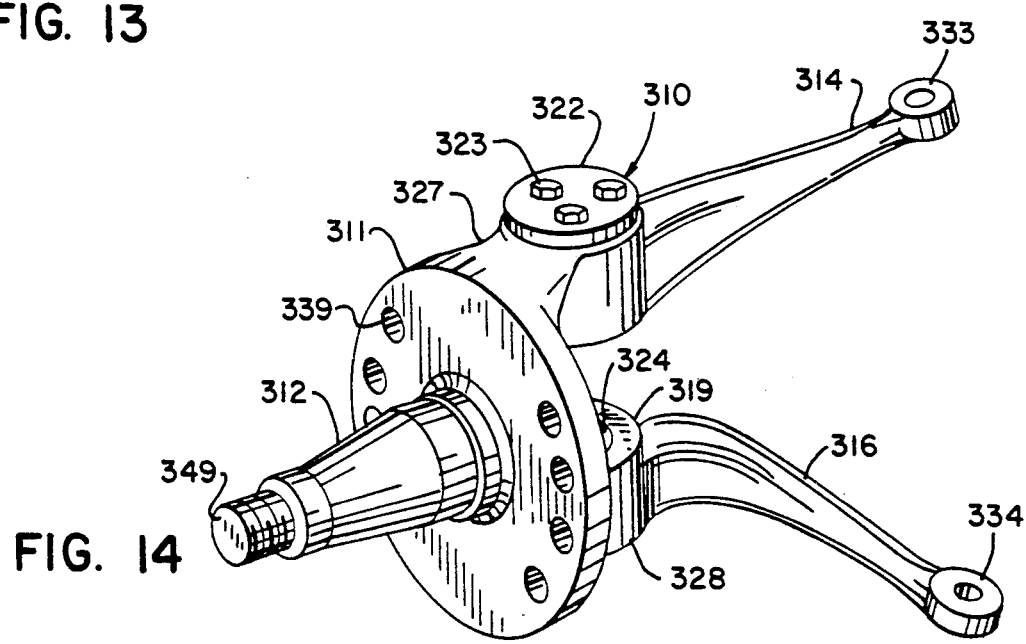

ONE-PIECE STEERING KNUCKLE ASSEMBLY

CROSS REFERENCE TO RELATED APPLICATIONS

This is a continuation-in-part of application Ser. No. 07/537,317 filed Jun, 12, 1990, which is a continuation-in-part of application Ser. No. 07/430,754 filed Nov. 2, 1989, both of which are now abandoned.

BACKGROUND OF THE INVENTION

This invention relates to a steering knuckle assembly for vehicles. More particularly, it relates to a one-piece steering knuckle assembly for heavy commercial vehicles such as trucks wherein the tie rod arm as well as a brake flange with or without a steering arm are forged together.

In the prior art it is known to provide a steering knuckle for bearing lubrication with tie rods which are fastened to the knuckle. This is provided in U.S. Pat. No. 1,755,627. It is also known in the prior art to provide an integral spindle arm with a steering knuckle for suspension purposes as well as to provide an integral brake flange for attachment to a brake backing plate. This is described in U.S. Pat. No. 2,556,767.

There is commonly available a steering knuckle for heavy duty motor vehicles such as trucks wherein the steering arm and the tie rod arm are fitted to a steering knuckle by means of a threaded portion and a fastening nut. These heavy duty steering knuckles also employ a flanged body to which is separately attached a brake spider unit for connection to a brake drum assembly.

There is a need in the heavy duty motor vehicle field to provide a steering knuckle assembly wherein the tie rod arm is integrally formed as a one-piece unit with the steering knuckle with or without a steering arm. This is accomplished by the present invention.

SUMMARY OF THE INVENTION

The invention provides a one-piece steering knuckle assembly for heavy commercial vehicles such as trucks or the like wherein a flanged body is constructed and arranged to receive a brake assembly. A wheel spindle extends from the flanged body. A tie rod arm is connected to the flanged body in a one-piece manner. There are enlarged bosses extending from the flanged body opposite the wheel spindle, the bosses having a bore which are axially aligned to receive a king pin. The flanged body, wheel spindle, tie rod arm and enlarged bosses are all formed from a single steel billet as a one-piece heavy duty forging. The forging is capable of being used in commercial vehicles having a gross vehicle weight of at least 14,000 lbs.

In one aspect of the invention both a tie rod arm and a steering arm are connected to the flanged body in the previously described one-piece manner.

In a preferred manner, the flanged body is forged in the form of a brake spider.

Also in a preferred manner, the steering arm or the tie rod arm are connected to the flanged body through enlarged bosses surrounding the bores for the king pin.

In another aspect of the invention, the wheel spindle is connected to said flanged body in a one-piece manner and opposite the steering or tie rod arms.

In yet another embodiment the flanged body is substantially flat and has openings therethrough for connection with the brake assembly.

It is an object of the invention to provide an improved steering knuckle for heavy commercial vehicles.

It is another object of the invention to provide a one-piece steering knuckle wherein the tie rod arm is integrally forged therein.

It is yet another object of the invention to provide a steering knuckle for heavy commercial vehicles which can be manufactured at reduced cost.

It is still another object of the invention is to provide a steering knuckle of the foregoing type wherein a brake flange is constructed with a one-piece knuckle with a steering rod arm or a tie rod arm.

These and other objects and advantages of the invention will be apparent from the following detailed description and drawings.

DESCRIPTION OF THE DRAWINGS

FIG. 1 is a top perspective view illustrating the single component and unitary knuckle assembly of this invention connected to an axle.

FIG. 2 is a view in partial vertical section of the single component knuckle assembly of FIG. 1 unconnected to the axle.

FIG. 3 is an end view of the steering knuckle shown in FIG. 1.

FIGS. 4–11 are perspective views illustrating the forging of the steering knuckle of this invention beginning with a heated steel billet.

FIGS. 12–14 are views similar to FIG. 1 depicting additional embodiments but unconnected to an axle or any steering or tie rods.

DESCRIPTION OF THE PREFERRED EMBODIMENT

Proceeding to a detailed description of the steering knuckle generally 10 and with reference to FIGS. 1–3, there is shown a flanged body 11 from which extends the usual wheel spindle 12. The flanged body 11 in this instance provides a brake spider 13. At the opposing side there is integrally formed with the flanged body 11 a steering arm 14 and a tie rod arm 16. The usual truck axle is shown at 18 and terminates in a collar 19. The steering knuckle 10 is connected to the axle 18 by the king pin 21 extending through the enlarged bosses 27 and 28 of the steering arm 14 and the tie rod arm 16, respectively. The king pin 21 is retained in the axle 18 by the bolt and washer shown at 25.

As best seen in FIG. 2, there are the openings 24 extending through the enlarged bosses 27 and 28 to accommodate the king pin 21. Caps such a shown at 22 in FIG. 1 are fastened to the bosses 27 and 28 by the screws 23 to close the king pin therein. A steering rod 30 is pivotally connected to the steering arm 14 by the nut 36 and the bolt 37 extending through the enlarged boss 33. Similarly, the tie rod 31 is pivotally connected to the tie rod arm 16 with the bolt and nut 37 and 36 extending through the enlarged boss 34.

As best seen in FIGS. 1 and 3, the flanged body 11 has the openings such as 39 and 40 for an attachment to the brake disk such as shown at 68 in U.S. Pat. No. 3,749,415 which teaching is incorporated herein by reference.

Additional embodiments generally 110, 210 and 310 are depicted in FIGS. 12–14. Similar numbers are employed to designate similar parts except they are in the "100", "200" and "300" series. In comparing these embodiments with that of FIG. 1, it is seen that the connection with the axle 18 is not shown. Neither are the connections with the steering or the tie rod arms.

Referring first to embodiment 110, it is similar to embodiment 10 except that it does not have a steering arm such as 14 for connection to a steering rod. This embodiment 110 would be employed in a truck in a paired manner with embodiment 10 wherein embodiment 10 would be the right hand version and embodiment 110 the left hand version. Embodiment 110 also shows that the enlarged bosses 127 and 128 can have a rounded portion for reception of a king pin 21.

Embodiments 210 and 310 could also be paired together on the same truck, with embodiment 210 being the left hand version and embodiment 310 the right hand version. Embodiments 210 and 310 differ from embodiments 10 and 110 in that the flanged bodies 211 and 311 are of the standard or conventional type which could receive a brake spider unit for connection to a brake drum assembly.

FIGS. 4-11 illustrate the forging of the steering knuckle 10 of this invention. The first step is that depicted in FIG. 4 where a steel billet is heated to forging conditions. The next step in the process is shown in FIG. 5 wherein the heated billet 42 is contacted with a forging roll to provide a reduced section such as shown at 43. Next, and as shown in FIG. 6, a tail end and preform such as shown at 46 is provided and would be effected by forming the billet 42 on a die. After this, and as shown in FIG. 7, a blocking step is effected in which the steering arm 14 and the tie rod arm 16 are formed as well as the flanged body 11 and the wheel spindle 12. Subsequently, and as shown in FIG. 8, a finished forging impression is accomplished wherein the wheel spindle is formed in its finished form and the enlarged bosses 27 and 28 are provided on the steering arm 14 and the tie rod arm 16. FIG. 9 shows the next step which is flash removal such as indicated at 47 in FIGS. 7 and 8. In FIG. 10 the tie rod arm 16 would be bent by die forming to the angular position as shown. The last step is shown in FIG. 11, which is a machining step in which the threads 49 are formed on the wheel spindle 12, the openings 24 and 52 are provided in the enlarged bosses 27, 28 and 33 and 34 and threaded screw bores such as 26.

Embodiments 110, 210 and 310 would be forged in a similar manner as previously described for embodiment 10 except that in the instance of embodiments 110 and 210 the forging of the rod arm such as 14 would be eliminated.

An important feature of this invention is the fact that the one-piece steering knuckles 10, 110, 210 or 310 by having the tie rod arms 16, 116, 216 and 316 integrally formed with the flanged body 11 eliminates the costly machining and connecting of the separate tie rod arms to prior steering knuckles. This is also true when the steering arms 14 and 314 are also integrally forged. The prior procedure requires the forming of separate bosses and machining so that threaded portions of these tie rod arms or steering arms could be fastened thereto. Further, the fact that there is a single flanged body 11 for connection to a brake drum assembly also avoids the previously used connection through the intermediate brake spider. All of these features are incorporated in a one piece steering knuckle assembly which is forged from a single billet of steel for use in heavy duty commercial vehicles such as trucks. This unitary construction not only provides for a rugged and reliable connection, but also reduces the costs of additional components as well as machining and the enlarged connecting bosses which require additional steel for their fabrication.

The one piece steering knuckle assembly as described herein is particularly employed in conjunction with heavy duty commercial vehicles including Class 5, 6, 7 and 8 trucks and busses. Its advantages can also be realized in commercial vehicles having a gross vehicle weight of at least 14,000 lbs.

Steel is the preferred metal used in forging the billet into a unitary steering knuckle. While the steering arms such as 14 and the tie rod arms such as 16 are shown at certain geometric positions with respect to the flanged body 11, it is obvious that they can take various forms and angles with respect thereto.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. A one-piece steering knuckle assembly for heavy commercial vehicles having a gross vehicle weight of at least 14,000 lbs comprising:
    a flanged body constructed and arranged to receive a brake assembly, said flanged body having first and second generally planar sides;
    a wheel spindle extending from said flanged body first side;
    upper and lower enlarged bosses extending from said flanged body second side opposite said wheel spindle, said bosses having a bore with said bores being axially aligned to receive a king pin; and
    a tie rod arm extending from said lower enlarged boss and away from said second side of said flanged body and spaced therefrom in a generally parallel manner,
    said flanged body, wheel spindle, tie rod arm and enlarged bosses all being formed from a single steel billet as a one-piece heavy duty forging.

2. The steering knuckle as defined in claim 1 wherein said flanged body is defined by a brake spider.

3. The steering knuckle as defined in claim 1 wherein said flanged body is adapted to receive a brake spider.

4. A one-piece steering knuckle assembly for heavy commercial vehicles having a gross vehicle weight of at least 14,000 lbs comprising:
    a flanged body constructed and arranged to receive a brake assembly, said flanged body having first and second generally planar sides;
    a wheel spindle extending from said flanged body first side;
    upper and lower enlarged bosses extending from said flanged body second side opposite said wheel spindle, said bosses having a bore with said bores being axially aligned to receive a king pin;
    a steering arm extending from said upper enlarged boss and away from said second side of said flanged body; and
    a tie rod arm extending from said lower enlarged boss and away from said second side of said flanged body and spaced therefrom in a generally parallel manner,
    said flanged body, wheel spindle, steering arm, tie rod arm and enlarged bosses all being formed from a single steel billet as a one-piece heavy duty forging.

5. The steering knuckle as defined in claim 4 wherein said steering arm and said tie rod arm include additional enlarged bosses at ends opposite said flanged body, said additional enlarged bosses having bores therethrough for connection with steering and tie rod linkages.

6. The steering knuckle as defined in claim 4 wherein said wheel spindle is connected to said flanged body opposite said steering and tie rod arms.

7. The steering knuckle as defined in claim 4 wherein said flanged body is substantially flat and has openings therethrough for connection with said brake assembly.

* * * * *